(No Model.) 2 Sheets—Sheet 1.

J. CRUMP & R. BRERETON.
STONE CUTTING MACHINE.

No. 318,962. Patented June 2, 1885.

Witnesses:

Inventors:
J. Crump &
R. Brereton,
by Dodge & Son
Attys (No Model.) 2 Sheets—Sheet 2.
J. CRUMP & R. BRERETON.
STONE CUTTING MACHINE.
No. 318,962. Patented June 2, 1885.
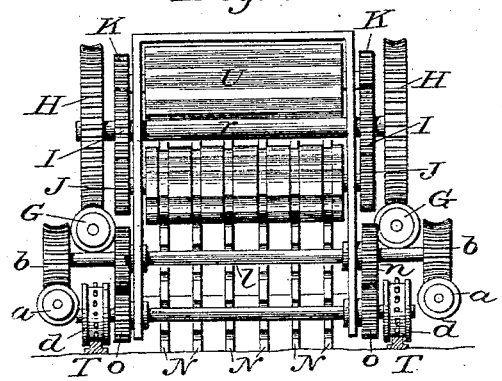
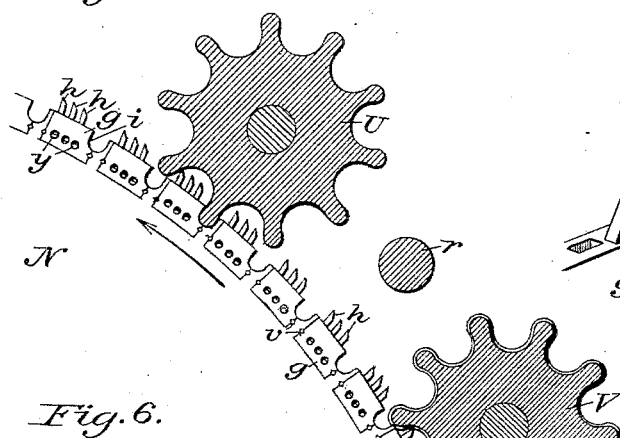
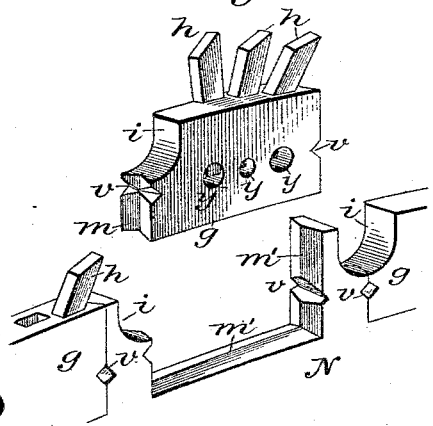
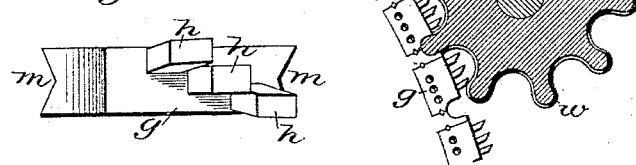
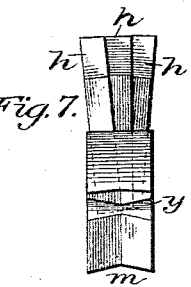
Witnesses:
Inventors:

UNITED STATES PATENT OFFICE.

JOHN CRUMP AND RICHARD BRERETON, OF PHILADELPHIA, PA.

STONE-CUTTING MACHINE.

SPECIFICATION forming part of Letters Patent No. 318,962, dated June 2, 1885.

Application filed January 23, 1885. (No model.)

*To all whom it may concern:*

Be it known that we, JOHN CRUMP and RICHARD BRERETON, of Philadelphia, in the county of Philadelphia and State of Pennsylvania, have invented certain new and useful Improvements in Stone-Cutting Machines, of which the following is a specification.

The present invention relates to machines used for cutting slate and similar stone in quarries; and the invention consists in certain novel devices and features of construction, as hereinafter more fully set forth.

Figure 1:
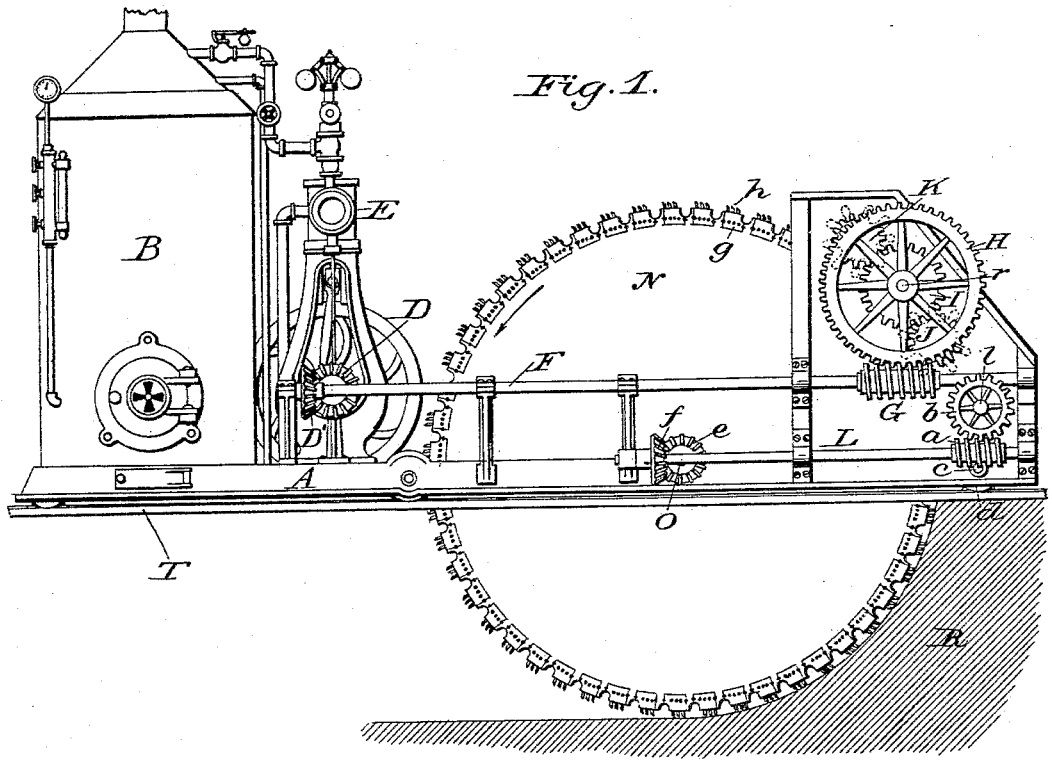
Figure 2:
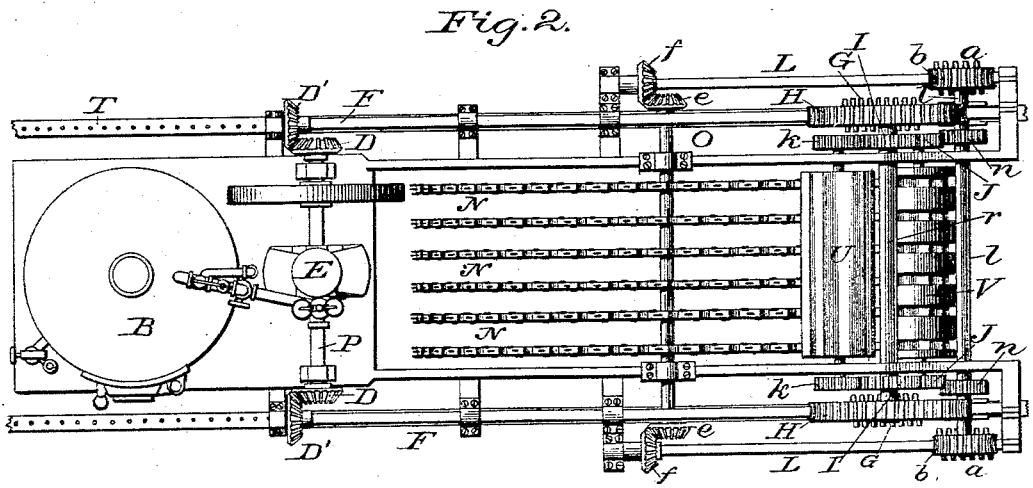

Figure 1 is a side elevation, Fig. 2 a top plan view, and Fig. 3 is a rear elevation, of the machine. Figs. 4, 5, 6, and 7 are views showing various parts more in detail.

The object of our present invention is to produce a machine operating on the general plan of those for which patents were granted to us October 17, 1882, and May 13, 1884, being Nos. 265,946 and 298,353 respectively, and which shall be more perfect in its construction and operation.

In the drawings, A indicates the frame of the machine, having the boiler B and the engine E, together with the cutter or cutters mounted thereon and arranged to run on a track, T, in a manner similar to that shown in Patent No. 298,353, the construction of the cutter and the mechanism for operating the same, however, being materially different. In this case the cutter consists of a steel disk, preferably about six feet in diameter, as indicated by N, Figs. 1, 2, 3, and 4, mounted on a shaft, O, as shown in Fig. 1 and 2; and, instead of having the teeth inserted directly in the periphery of the disk itself, as in our former patents, we now insert the teeth *h* in a series of detachable steel blocks, *g*, as shown in Fig. 1, and in detail and enlarged in Figs. 4, 5, 6, and 7. These blocks *g* are made rectangular in outline, except that their rear upper corner is cut away on a curve, as shown in Figs. 4 and 5, to form a recess, *i*, for the teeth of the driving-wheels or rolls to engage in, as hereinafter more fully described. These blocks *g* are fitted into corresponding recesses made in the periphery of the disk N, as represented in Figs. 1, 4, and 5, the lower edge and both ends of said blocks *g* being provided with a V-shaped groove, *m*, as shown in Figs. 5, 6, and 7, and the walls of the recesses in the disk N being provided all around with an inverted-V-shaped edge, *m'*, as shown clearly in Fig. 5, so that when the block is inserted in the recess it will be held firmly against lateral displacement.

To lock the block in place, it and the end walls of each recess have a V or other shaped notch formed in them, as indicated by *v*, Fig. 5, these notches coming opposite each other when the block is in place, so that a key or pin driven therein will lock the parts securely together.

As represented in Figs. 1 and 4 and enlarged in Fig. 5, the edge of the disk N opposite the point where the rear corner of the block *g* is cut on a curve, as above stated, is also cut away on a reversed curve, so that when the block is inserted there is thus formed a proper-shaped recess for the teeth of the driving-wheels to engage in, as shown in Fig. 4. By this arrangement it will be seen that the wear caused by the rubbing or friction and pressure of the teeth of the driving wheel or wheels is entirely on the curved portion of the blocks *g*, which can be replaced at any time when necessary.

The teeth or cutters proper formerly used by us were made of various shapes on their cutting-points and had to be specially forged for that reason, and were therefore costly. We now make the teeth *h* straight and simply cut them by an inclined or beveled cut from a plain steel rod of the proper size, this inclined cut imparting to their cutting ends the proper inclination or bevel, as shown in Fig. 5, they only requiring to be tempered and ground after being cut from the rod, so far as their cutting-points are concerned. Their bodies are slightly reduced and tapered to fit into corresponding-shaped holes in the outer edge of the blocks *g*, as shown in Figs. 5, 6, and 7, these holes or mortises extending down far enough to give a good firm support for the teeth *h*, and being so arranged that while the center tooth shall project from the edge of the block in a right line the other two shall be slightly inclined laterally, so that their outer edges or sides shall project a little beyond the sides of the blocks *g* and of the disk N, whereby the channel cut in the stone by the series of teeth shall be a little wider than the disk is thick, so it shall not rub or bind therein, but shall have a clearance. At the point where the teeth terminate in the blocks a transverse hole, $y$, is made through the block in line with each tooth, as shown more clearly in Fig. 5, for the purpose of starting the teeth by driving a conical or tapering punch therein. The teeth are simply driven into their sockets in the blocks, and, being slightly tapered, can be removed by hand as soon as loosened, as above stated.

In our former machines motion was imparted to the disk by means of two shafts arranged on opposite sides of the disk, and having a series of pins or studs which engaged in holes in the disk near its periphery. Instead of this we now impart motion to the disk by means of one or more wheels, the teeth of which engage in recesses on the periphery of the disk N, as shown more clearly in Fig. 4. The disk N is mounted on a transverse shaft, O, on the frame A, as shown in Figs. 1 and 2, and the driving-wheels U and V are mounted at any convenient point to gear with the disk, but preferably on the upper front side of the same, as shown in Figs. 1 and 2. Any number of these driving-wheels may be employed, there being two such shown in the drawings. Motion is given to these wheels U and V through the medium of spur-gear wheels K and J at each side of the frame, and which are arranged on opposite sides of a shaft, $r$, which carries at each side of the frame a spur-gear, I, as shown in Figs. 1, 2, and 3. On this same shaft $r$, outside of the gear-wheels I, there is secured a worm-wheel, H, with which an endless screw or worm, G, engages, these worms G each being secured to a shaft, F, mounted in suitable bearings on the frame A and extending forward to the shaft P of the engine, with which they connect by means of bevel gear-wheels D and D', as shown clearly in Figs. 1 and 2. By these means the power for operating the disk or disks N is taken direct from both ends of the engine-shaft P through the shafts F, with their worms or screws G, worm-wheels H, and the gear-wheels I, J, and K, the arrangement being the same on both sides of the machine.

In order to steady the disk and prevent any lateral bending or springing of the same, at least one of the driving-wheels V is provided with annular grooves or flanges, as shown in Figs. 2 and 3, in which the periphery of the disk fits as it rotates. In such case these flanges will bear against or come alongside of the outside teeth $h$, thus holding the disk against lateral spring. By extending a flange down alongside of or beyond the teeth of the wheel V, as shown at $w$, Fig. 4, these flanges will bear against the sides of the disk and the blocks $g$ at the points where the teeth of the wheel enter the recesses without touching the cutting-teeth $h$.

It will be observed that the recesses in the periphery of the disk are at such a distance apart, and that the teeth of the wheels U and V are of such a length, that the spaces between them are of sufficient depth and width to permit the series of cutter-teeth in each block to enter the space between the teeth of the driving-wheels without touching the latter, as shown in Fig. 4, thus enabling the disk to be operated from its periphery by gear-wheels without touching or in any manner interfering with the cutting-teeth.

The machine is fed or moved forward on the track or rails T by means of wheels $d$, Figs. 1 and 2, which are provided on their periphery with pins or teeth, which engage in holes or cavities in the rails T, similar to that shown in our previous patent, No. 298,353, motion being imparted to them by means of worm-wheels $b$, driven by a worm, $a$, on a shaft, L, on each side of the machine, these shafts L being connected to the shaft O of the disk N by bevel gear-wheels $e f$, as shown in Figs. 1 and 2, the shaft $l$ of the worm-wheels $b$ carrying spur-wheels $n$, which engage with similar wheels, $o$, on the shaft of the feed-wheels $d$, as shown in Fig. 2.

Thus far we have described the machine as having but a single disk, N, arranged to cut but one channel at a time, as in our former patents; but it is obvious that by the present construction and mode of driving the disk any desired number of such disks may be mounted on the same shaft, and thus a gang of them be used in the same machine, thereby cutting a series of parallel channels in the rock at once; and we have shown the machine as having six of these disks all mounted on the same shaft.

In order to cut the channels at varying distances apart, so as to get out stone of any width desired, the disks N are simply keyed or otherwise secured upon their shaft O in such a manner that they can be moved laterally thereon, and in such case the driving-wheel U, as shown in Figs. 2 and 3, will be made in the form of a shaft or roll, with its teeth extending from side to side of the machine, so that they will gear with one or more disks, and so that the disks may be adjusted laterally on their shaft and still remain in gear with the driving-wheel U.

In order to adapt the grooved wheel V to the changed position of the disks, a series of such wheels may be provided, with their grooves arranged at different points; or, what would be more convenient, a series of disks provided with annular grooves may be provided and mounted on a shaft with means for adjusting them laterally thereon, to correspond with the adjustment of the disks N, as desired.

We have shown both wheels U and V provided with teeth, so that both shall aid in driving the disks N; but, if preferred, one may be a driving-wheel and the other simply operate as a guide to steady the disks N, as above described.

The advantages of our improvement are obvious. By using a gang of disks any desired number of channels can be cut at one operation, whereas before it was necessary to move the track and the machine laterally and adjust and arrange the track with care for each separate channel cut. By our present machine the channels can be cut at any desired distance apart within the width of the machine, all of the channels being parallel and true, thus enabling the stone to be cut of any desired width, with the sides true and parallel. Moreover, there is great economy in thus using a gang of cutting-disks, as a single engine of a larger size, with the same number of attendants, is enabled to cut a very much larger amount of stone in the same time. By using the detachable blocks for holding the teeth the block, with its teeth, can be taken out and another inserted while the machine is in operation, the disk rotating at a very slow rate, and the teeth be removed from the block, reground and replaced, and be ready for use again without stopping the machine. So, too, as all the wear of the driving-wheels is upon these removable blocks, which can be replaced at any time, the disk is kept intact, and thus rendered more durable. Moreover, the disk is not weakened by the series of holes, as in our former patents, and, besides, we are enabled to apply the power for rotating it at its extreme periphery, which could not be done with the former construction.

Having thus described our invention, what we claim is—

1. The combination, in a stone-channeling machine, of one or more disks, N, provided with a series of detachable blocks, *g*, each having a recess, *i*, for the teeth of the driving-wheel to bear against, and one or more driving-wheels, U, having its teeth arranged to engage with and bear against the recesses in said blocks, with mechanism, substantially such as shown, for imparting motion to the same.

2. The detachable blocks *g*, arranged to fit in recesses in the periphery of the disk N, said blocks being provided with a series of sockets of differing inclinations laterally for the reception of the straight teeth or tools *h*, whereby the projecting points of said teeth are made to spread and cut a channel of greater width than the thickness of the disk or blocks without any curvature of the teeth or any lateral cutting-lips formed thereon, substantially as shown and described.

3. The combination, in a stone-cutting machine, of the frame A, with one or more cutting-disks N mounted therein, and an engine, E, mounted on said frame and having its shaft P connected at opposite sides by means of bevel-gear with shafts F, mounted in bearings at opposite sides of the frame, said shafts being each provided with a worm, G, engaging with worm-wheels H, connected by suitable intermediate gearing with the drive-wheel U, having its teeth or ribs arranged to engage with notches in the periphery of the disks N, the whole being arranged to operate substantially as shown and described.

JOHN CRUMP.
RICHARD BRERETON.

Witnesses:
  CHAS. L. CRUMP,
  DAVID BRERETON.